(12) United States Patent
Schmelz et al.

(10) Patent No.: US 9,357,403 B2
(45) Date of Patent: May 31, 2016

(54) CONFLICT HANDLING IN SELF-ORGANIZING NETWORKS

(75) Inventors: Lars Christoph Schmelz, Haar (DE); Mehdi Amirijoo, Linköping (SE); Remco Litjens, Voorschoten (NL); John Turk, Newbury (GB); Andreas Eisenblaetter, Berlin (DE); Michaela Eden, Braunschweig (DE)

(73) Assignee: NOKIA SOLUTIONS AND NETWORKS GMBH & CO. KG, Munich (DE)

( * ) Notice: Subject to any disclaimer, the term of this patent is extended or adjusted under 35 U.S.C. 154(b) by 74 days.

(21) Appl. No.: 13/885,245

(22) PCT Filed: Nov. 11, 2011

(86) PCT No.: PCT/EP2011/069967
§ 371 (c)(1),
(2), (4) Date: Jul. 23, 2013

(87) PCT Pub. No.: WO2012/065923
PCT Pub. Date: May 24, 2012

(65) Prior Publication Data
US 2013/0294286 A1    Nov. 7, 2013

(30) Foreign Application Priority Data
Nov. 15, 2010   (EP) .................................... 10191226

(51) Int. Cl.
*H04W 16/18*   (2009.01)
*H04W 24/02*   (2009.01)
*H04W 84/18*   (2009.01)
*H04W 24/04*   (2009.01)

(52) U.S. Cl.
CPC .............. *H04W 16/18* (2013.01); *H04W 24/02* (2013.01); *H04W 24/04* (2013.01); *H04W 84/18* (2013.01)

(58) Field of Classification Search
CPC ..... H04W 16/18; H04W 24/02; H04W 24/04; H04W 84/18
USPC .......................................... 370/254, 252, 241
See application file for complete search history.

(56) References Cited

U.S. PATENT DOCUMENTS 8,588,759 B2 * 11/2013 Moe et al. .................. 455/422.1
2011/0045835 A1 * 2/2011 Chou et al. .................... 455/446

FOREIGN PATENT DOCUMENTS

CN          1599365 A      3/2005

OTHER PUBLICATIONS

International Search Report and Written Opinion dated Feb. 29, 2012 corresponding to International Patent Application No. PCT/EP2011/069967.

(Continued)

*Primary Examiner* — Mohammad Anwar
(74) *Attorney, Agent, or Firm* — Squire Patton Boggs (US) LLP

(57) ABSTRACT

A mechanism to handle conflict situations relating to configuration parameter value changes that can be made by two or more different self-organizing network functions is provided. The mechanism is based on storing and maintaining at least short term history information on configuration parameter value changes (33, 34, 35, 36) and utilizing the history information to determine whether or not to allow a configuration parameter value change.

16 Claims, 3 Drawing Sheets

| | 31 | 32 | 33 | 34 | 35 | 36 | 37 | 38 | 39 |
|---|---|---|---|---|---|---|---|---|---|
| P1 | A | t1 | X1 | X7 | A | $\Delta t = y$ | | |
| P2 | A, B, C | t2 | X2 | X8 | C | if A, $\Delta t = z$<br>Otherwise $\Delta t = z'$ | L | |
| P3 | B, C | t3 | X3 | X9 | C | after B $\Delta t = y$<br>after C $\Delta t = z$ | | |
| P4 | C | t3 | X4 | X10 | C | decrease $\Delta t = y'$<br>increase $\Delta t = z'$ | | |
| P5 | C | t4 | X5 | X11 | C | $\Delta t = f(\Delta change)$ | | |
| P6 | A, B, C | t5 | X6 | X12 | B | | | T |

~300

(56) References Cited

OTHER PUBLICATIONS

Tobias Bandh, et al., "Policy-Based Coordination and Management of SON Functions," VDE/ITG Workshop on "Consistent System Optimization," Oct. 6, 2010, pp. 1-12, XP002625806, retrieved from internet: www.ikr.uni-stuttgart.de/Content/itg/fg524/Meetings/2010-10-06-Stuttgart/01_ITG524_Stuttgart_Sanneck.pdf.

Lars Christoph Schmelz, "SON Coordinator—SOCRATES Approach," FP7 ICT-Socrates, Oct. 20, 2010, pp. 1-18, XP002625807, retrieved from internet: www.fp7-socrates.eu/files/Presentations/SOCRATES_2010_RAS%20cluster%20presentation.pdf.

Neil Scully et al., "INFSO-ICT-21684 SOCRATES D5.10: Measurements, Architecture and Interfaces for Self-organising Networks," FP7 Socrates, Oct. 31, 2010, pp. 1-47, XP002625808, Retrieved from the Internet: www.fp7-socrates.eu/files/Deliverables/SOCRATES_D5.10%20Measurements,%20architecture%20and%20interfaces%20for%20self-organising%20networks.pdf.

Korean Office Action dated Aug. 25, 2014 corresponding to Korean Patent Application No. 10-2013-7015395.

Neil Scully, "SOCRATES Key Results," NGMN OPE Workshop, Jun. 15, 2010, pp. 1-34.

State Intellectual Property Office, P.R. China, Chinese Office Action for corresponding Chinese Patent Application No. 201180055004.4, dated May 27, 2015.

* cited by examiner

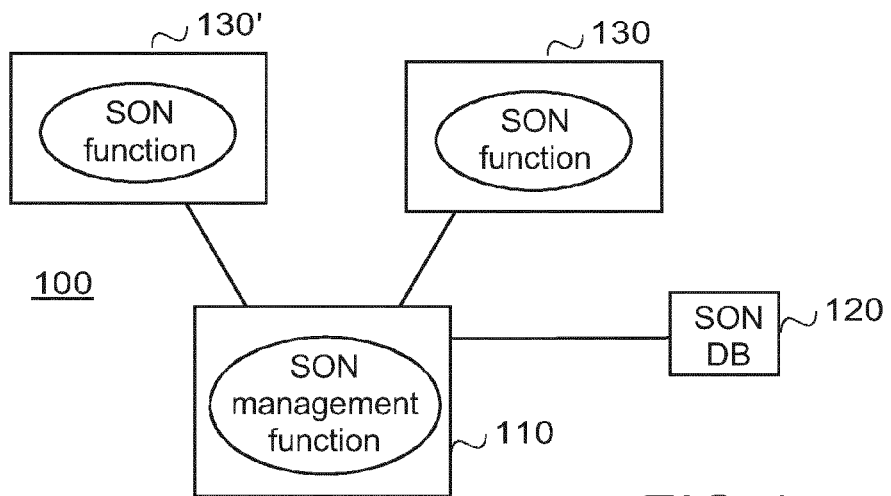
FIG.1
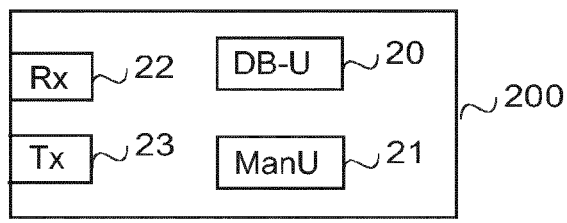
FIG.2
| | 31 | 32 | 33 | 34 | 35 | 36 | 37 | 38 | 39 |
|---|---|---|---|---|---|---|---|---|---|
| | P1 | A | t1 | X1 | X7 | A | $\Delta t = y$ | | |
| | P2 | A, B, C | t2 | X2 | X8 | C | if A, $\Delta t = z$ <br> Otherwise $\Delta t = z'$ | L | |
| | P3 | B, C | t3 | X3 | X9 | C | after B $\Delta t = y$ <br> after C $\Delta t = z$ | | |
| | P4 | C | t3 | X4 | X10 | C | decrease $\Delta t = y'$ <br> increase $\Delta t = z'$ | | |
| | P5 | C | t4 | X5 | X11 | C | $\Delta t = f(\Delta change)$ | | |
| | P6 | A, B, C | t5 | X6 | X12 | B | | | T |
300
FIG.3

CONFLICT HANDLING IN SELF-ORGANIZING NETWORKS

The work leading to this invention has received funding from the European Community's Seventh Framework Programme (FP7/2007-2013) under grant agreement n° 216284.

FIELD

The present invention relates to communication networks, and in particular, to self-organizing networks.

BACKGROUND ART

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

The evolvement of communication technology, especially the wireless communication technology, has increased the complexity of networks and the amount of network nodes, thereby increasing operation and maintenance tasks i.e. management tasks. To automate at least some of the tasks a concept called a self-organizing network (SON) is introduced by Next Generation Mobile Networks (NGMN) Alliance and 3GPP (Third Generation Partnership Project) to be used first in long term evolution (LTE) access network, and later on in other networks, both in access and core networks. A self-organizing network is capable to self-configure and continuously self-optimize itself in response to network and traffic changes. In such a network, the network and/or a network node alters automatically, without human involvement, its configuration parameters, such as transmission and/or reception parameters, by means of different self-organizing network functions.

One of the problems associated with the self-organization is that a value of a configuration parameter may be changed by the different self-organizing network functions within a rather short time which may lead to oscillation of the parameter value and thereby to an unstable behaviour of the network.

SUMMARY

An object of the present invention is thus to provide a method and an apparatus for implementing the method so as to overcome the above problem. The object of the invention is achieved by methods, an apparatus, a system and a computer program product which are characterized by what is stated in the independent claims. The preferred embodiments of the invention are disclosed in the dependent claims.

The invention is based on storing and maintaining at least short term history information on configuration parameter value changes and utilizing the history information to determine whether or not to allow a configuration parameter value change.

An advantage of the invention is that it provides a mechanism to handle conflict situations relating to configuration parameter value changes that can be made by two or more different functions.

BRIEF DESCRIPTION OF THE DRAWINGS

In the following, embodiments will be described in greater detail with reference to accompanying drawings, in which FIG. 1 shows simplified architecture of an exemplary system;

FIG. 2 is a schematic block diagram of an exemplary apparatus;

FIG. 3 illustrates an exemplary content of a database;

DETAILED DESCRIPTION OF SOME EMBODIMENTS

Figure 4:
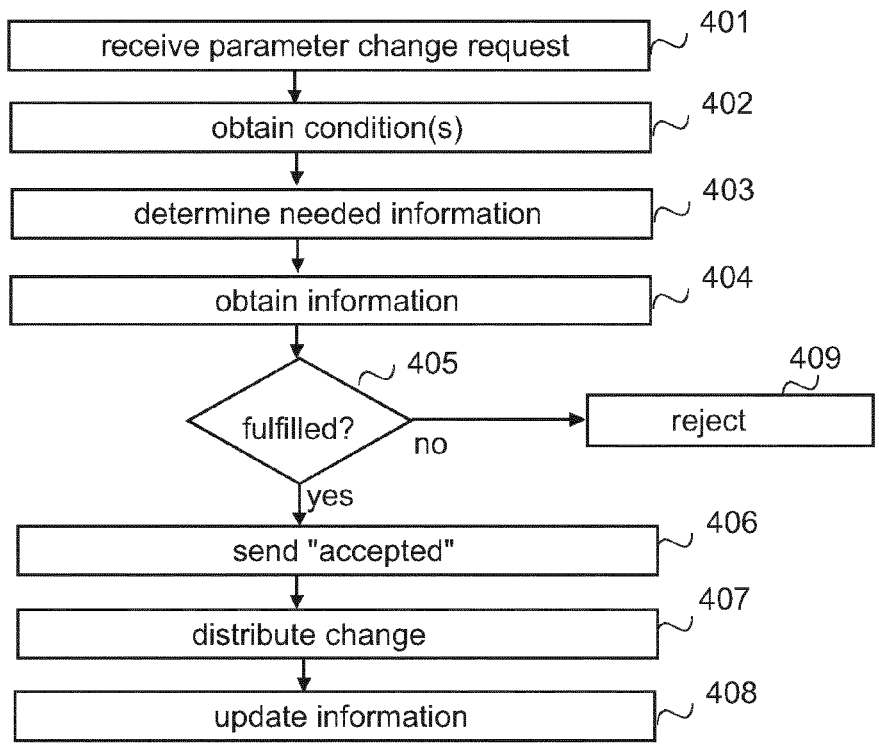
FIG. 4 is a flow chart illustrating functionality of an apparatus according to an embodiment.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any communication system or any combination of different communication systems and corresponding networks and network nodes that support self-organizing network functionality. The communication system may be a wireless communication system or a communication system utilizing both fixed networks and wireless networks or a fixed communication system. The specifications of communication systems and networks, especially in wireless communication, develop rapidly. Such development may require extra changes to an embodiment. Therefore, all words and expressions should be interpreted broadly and they are intended to illustrate, not to restrict, the embodiment.

Below an acronym SON is used to mean self-organizing network, and the term "parameter" to mean a configuration parameter. A general architecture of a communication system 100 providing self-organizing network functionality is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the actual functions and measurements used in self-optimisation, self-configuration and self-healing, structures, elements and the protocols used in or for information exchange, including control information, and in or for database management, are irrelevant to the actual invention. Therefore, they need not to be discussed in more detail here. FIG. 1 shows a solution based on a distributed allocation of SON functions in which the SON functions are located in network nodes 130, 130' configured to support SON functionality. Further, in the embodiment, a centralized SON database 120 and a centralized SON management function is used. In the illustrated embodiment, the SON management function is in another network node 110 than the SON database.

The network nodes 130, 130' containing the SON functions may be network nodes in a radio access network or in a core network, or one of them is in a core network and the other in the radio access network. An example of such a node is a "plug and play" base station without restricting the implementations and embodiments described herein to such a solution. The SON functions may be called SON use cases. Examples of SON functions include mobility load balancing, handover optimization, cell outage management, and mobility robustness optimization. The network nodes may be any computing apparatus or device configured to perform the SON functionality and execute the SON functions.

The network nodes 110, 120 containing the SON management function and the SON database may locate in an operation administration maintenance part of a network and be part of an operation support system. However, it bears no significance where the database, or part of it, or the SON management function or functions locate. For example, the SON management function may locate in the same network node as the SON database, and/or parts of the SON database content and/or parts of the SON management function may be distributed to other network nodes, as will be described below.

The network nodes 110, 120 containing the SON management function and the SON database may be any apparatus or device or equipment able to carry out processes and/or store content as will be described below. The SON database may be of any type, have any possible storage structure and being managed by any database management system.

It should be appreciated that instead of the centralized solution, a distributed solution or a hybrid solution containing features from the centralized solution and from the distributed solution may be applied in all embodiments. In other words, embodiments are implementable regardless of where the SON functions are implemented (at network element level, at domain manager level, and/or at network management level), and the SON management function may be implemented at one or more layers, for example at one or more of the above described levels, if two interacting SON functions are implemented on different levels, for example.

FIG. 2 is a simplified block diagram of a network node, or a corresponding apparatus or corresponding network equipment, that may be used in embodiments. The network node 200 is a computing device configured to perform one or more of network node functionalities described with an embodiment, and it may be configured to perform functionalities from different embodiments. For this purpose, the network node comprises a database (DB-U) unit 20 for storing information on parameter value changes, and a management (ManU) unit 21 for using the information and for deciding whether or not a parameter value may be changed. The management unit may be a separate unit or integrated to another unit in the network node. In other embodiments, the management unit 21, or part of its functionality, may locate in another network node than the database unit 20 and/or the content of the database unit is divided among different network nodes. An example of the content in the database unit 20 is described in more detail below with FIG. 3, and the functionality of the management unit 21 is described in more detail below with FIGS. 4 and 5. The units may be software and/or software-hardware and/or firmware components (recorded indelibly on a medium such as read-only-memory or embodied in hard-wired computer circuitry).

The techniques described herein may be implemented by various means so that an apparatus implementing one or more functions of a corresponding entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. Software codes may be stored in any suitable, processor/computer-readable data storage medium(s) or memory unit(s) or article(s) of manufacture and executed by one or more processors/computers.

A network node, or a corresponding apparatus, or corresponding network equipment implementing functionality or some functionality according to an embodiment may generally include a processor (not shown in FIG. 2), controller, control unit, micro-controller, or the like connected to a memory and to various interfaces of the apparatus. Generally the processor is a central processing unit, but the processor may be an additional operation processor. The management unit 21 may be configured as a computer or a processor, or a micro-processor, such as a single-chip computer element, or as a chipset, including at least a memory for providing storage area used for arithmetic operation and an operation processor for executing the arithmetic operation. The management unit 21 may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed in such a way to carry out one or more functions of one or more embodiments. In other words, the management unit 21 may be an element that comprises one or more arithmetic logic units, a number of special registers and control circuits.

Further, the network node may comprise other units, and it comprises different interface units, such as a receiving unit 22 for receiving different inputs, control information, requests and responses, for example, and a sending unit 23 for sending different outputs, control information, responses and requests, for example. The receiving unit and the transmitting unit each provides an interface in an apparatus, the interface including a transmitter and/or a receiver or a corresponding means for receiving and/or transmitting information, and performing necessary functions so that content, control information, etc. can be received and/or transmitted. The receiving and sending units may comprise a set of antennas, the number of which is not limited to any particular number.

The network node, or a corresponding apparatus, or network equipment may generally include volatile and/or non-volatile memory, for example EEPROM, ROM, PROM, RAM, DRAM, SRAM, firmware, programmable logic, etc and typically store content, data, or the like. The memory may store the database 20 depending on embodiment and its implementation. The memory may also store computer program code such as software applications (for example, for the management unit) or operating systems, information, data, content, or the like for the processor to perform steps associated with operation of the apparatus in accordance with embodiments. The memory, or part of it, may be, for example, random access memory, a hard drive, or other fixed data memory or storage device implemented within the processor/network node or external to the processor/network node in which case it can be communicatively coupled to the processor/network node via various means as is known in the art. An example of an external memory includes a removable memory detachably connected to the apparatus.

The different units may be connected to the management unit 21.

It should be appreciated that the apparatuses may comprise other units used in or for information transmission, in or for network management systems, and/or for database management systems, which store database contents, allowing data creation and maintenance, and search and other access obtaining data from the database unit. However, the invention poses no specific requirements for them and, therefore, they need not to be discussed in more detail here.

FIG. 3 illustrates an example of content in a database 300. A parameter for which information is stored in the database may be any parameter. Examples of the parameters include power settings, antenna parameters, neighbour cell lists, handover parameters, scheduling parameters and admission control parameters.

In the illustrated example each parameter 31 is associated with the following information:

- indications 32 of functions that can change the value of the parameter;
- a time 33 of the last allowed change of the value;
- a current value 34 of the parameter;
- a previous value 35 of the parameter;
- an indication 36 of the function which performed the last allowed change;
- a set of conditions 37 defining when a change is allowed;
- an indication 38 whether or not the parameter value is locked by a function; and
- an indication 39 whether or not a token is associated with a parameter.

The indications 32 of functions that can change the value of the parameter may be used to confirm that a function requesting a permission to change belongs to the ones that can change the value. The indications may also be used to check, if further analysis is required: in an implementation, if only one function can change the value, no further check is required and thereby performed, but if two or more functions can change the value, the checking process continues. It should be appreciated that in another implementation the checking is performed also when the indications 32 indicate only one function. In a further implementation the database does not contain the indications 32 of functions that can change the value of the parameter. In an additional implementation the database contains, in addition to or alternatively, indications of network node types that can change the value of the parameter.

The time 33 of the last allowed change of the value may be a time stamp, or corresponding information. It may be used to determine how long ago the value changed, for example.

The current value 34 of the parameter, and a previous value 35 of the parameter may be used to determine whether the previous change increased or decreased the value, and how much it was increased/decreased. By comparing the current value 34 with the intended value, it may be determined, whether the intended change is a decrease or an increase. In another embodiment the previous value is replaced by an indication indicating whether the previous change decreased or increased the value, and the indication may contain information on the size of the change.

The indication 36 of the function which performed the last allowed change may be needed in a condition. For example, if the same function performed the previous allowed change, the intended change is always allowed but if it was another function, there is a condition relating to a time or size of the change, for example.

The set of conditions 37 defining when a change of a specific parameter is allowed comprises one or more conditions/rules used for deciding whether or not an intended change is allowed. The set is also called a policy. The embodiments do not restrict the content of the conditions at all, and they may be freely defined. Examples of different rules include that a value may be changed after a certain time period, the time period being the same, or depending on the function requesting permission to change and/or on the function that last time performed the change, and/or depending on the direction (increase, decrease) of the last change and/or on the size of the intended change and/or previous change(s) and/or the time period may be calculated using history information as input for a function calculating the time period. The information needed by the set of condition(s) may affect to the content of the database. For example, if a rule determines that the time period depends on the directions of four previous changes, information on them needs to be maintained. Another example is that if a rule determines that the time period depends on a network node or a type of a network node that performed the previous change, information on it needs to be maintained. Providing parameter-specific sets of conditions enables to take the features relating to a specific parameter into account. However, in an embodiment there is only one set of condition(s) that is applied to all parameters. For example, a parameter value may be changed only after 15 minutes from its previous change, or if a parameter value is increased the time to lapse before next change is 10 minutes and in case of a decrease 15 minutes.

The indication 38 whether or not the parameter value is locked by a function indicates a locking state of the parameter in implementations supporting parameter locking. The locking may be implemented by means of a locking switch. The parameter locking may be used as an additional condition, and a function may be configured to lock a parameter whose value it is not going to change while it is changing, or trying to change, or after a successful change, a value of another parameter in order to prevent other functions to change the value. Another use example (and a possible advantage provided by the lock) is that a SON function is capable by means of the lock to ensure that the SON function can observe metrics that are influenced by this locked parameter without being disturbed by change requests of other SON functions to this parameter. To prevent from a continuous locking of one or a set of parameters, and to allow a change of the locked parameter in case of dedicated events, such as alarms, self-healing or self-configuration activities, the SON management function may be configured to release the lock after a certain period of time after the parameter was locked (the time period may depend on a function that locked the parameter) and/or in response to a dedicated event and/or if SON functions have been associated with priority information, a higher priority SON function requesting a parameter change. The indication 39 whether or not a token is associated with a parameter is introduced in the illustrated example to indicate a parameter whose value is (or it is believed that it will be) frequently or continuously changed to ensure that no simultaneous change requests to the parameter in question are made. The indication 39 may indicate whether a SON function has requested a token and currently owns it, and thereby other functions are not allowed to perform the change. The token may be stored in the database. For example, if the token is stored instead of the indication 39, a missing token indicates that it has been requested. The token may be assigned by the SON management function in response to a request from a SON function. The token may be returned to the SON management function or directly to the database after a SON function owning the token has finished its change procedure, or automatically after a preset time period.

It should be appreciated that the content in the database depends on implementation details and information needed for determining whether or not a change of the parameter value is allowable which in turn depends on a condition or conditions used, as is explained above. Further, conditions (policies) for change may be stored in a database containing also other policies or they may be coded to the SON management function, for example. In other words, there are no restrictions for the content as long as some history information is stored/maintained for at least one parameter, the history information including at least one of the following: a time of the last allowed (performed) change of the value, times of two or more performed changes of the value, a current value of the parameter, one or more previous values of the parameter, the size of the last change or two or more last changes, the direction (increase/decrease) of the last change or two or more last changes, an indication of the function which performed the last allowed change, indications of the functions which performed the last and one or more allowed changes. Further, the content in the database may be different for different parameters. Using the functions in FIG. 3, information stored for function P6 may be only the token, for example. Another example relates to a parameter whose condition is that the value may be changed if the parameter is not locked, in which case the condition may be coded to a SON function, as well as the locking and releasing the lock, and the database may contain, i.e. associated with the parameter, only information whether or not the parameter is locked. It should be also appreciated that there may be parameters used by one or more SON function for which parameters no history information is stored to the database.

Below different embodiments are illustrated using instead of a network node comprising and executing (performing) a function the mere function for the sake of clarity. It is also assumed, for the sake of clarity, that a change request contains only one parameter. However, it should be appreciated that it depends on an implementation whether a change request may contain one or more parameters the values of which are intended to change or a separate change request has to be sent for each parameter separately. A further assumption made below is that locking and token are not implemented, i.e. all conditions relate to history information.

FIG. 4 is a flow chart illustrating an embodiment in which an independent SON management function is implemented and in which SON functions are configured to add to a change request information on the intended change, and after performing the change to send information on the change to the SON management function. FIG. 4 starts when the SON management function receives, in step 401, a parameter change request from a SON function. Therefore the SON management function obtains, in step 402, a set of conditions relating to the parameter. Depending on an implementation, the set of conditions may be obtained from the SON database or from a policy database, or from an internal database. When the conditions are obtained, the SON management function determines, in step 403, on the basis of the condition(s) information needed for the condition(s) from the SON database. Then the SON management function obtains, in step 404, the information it needs from the SON database. Then the SON management function checks, whether or not the condition(s) is/are fulfilled (step 405). If the condition(s) is/are fulfilled (step 405), the SON management function sends, in step 406, in a response to the SON function information that the request was accepted. Then the SON management function distributes, in step 407, the intended configuration change (the parameter value change in this example) via a configuration interface to network node(s) concerned and updates (i.e. sends an update), in step 408, the SON database. The update preferably contains updates to the information needed for the conditions. The information on the intended change may be a mere time stamp indicating the time the change was performed, and the SON database may be configured to maintain other information, such as the intended new value, and if needed, calculate a value change before sending the update information.

If the condition(s) is/are not fulfilled (step 405), the request is rejected and the SON management function sends, in step 409, a rejecting response to the SON function.

In another embodiment of the invention, in which the conditions are also in the SON database, the SON management function obtains the conditions and information associated with the parameter at the same time without determining information needed for conditions (i.e. steps 402 and 404 are combined and step 403 skipped).

An advantage of having an independent SON management function is that it simplifies development and improvement of single SON functions, as not all aspects regarding potential conflicts with other SON functions have to be taken into account in a single SON function.

Figure 5:
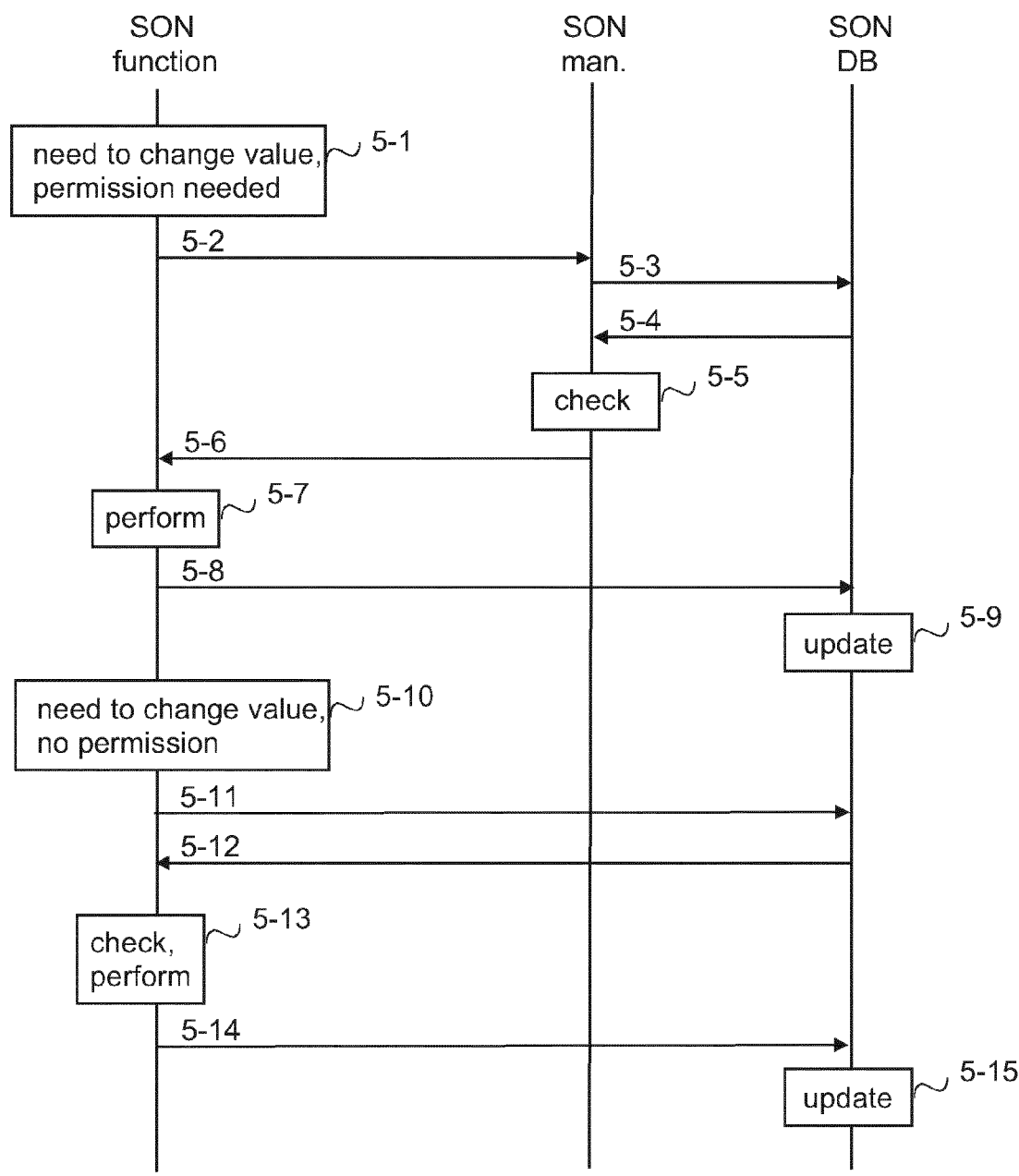

FIG. 5 is a signalling chart illustrating an embodiment in which some of the SON management functionality is copied/transferred to a SON function (or performed in cooperation in the network node comprising the SON function so that it looks like to the "outer world" as one SON function). In the example, the SON function is parameter-specifically configured either to ask from the SON management function in a network a permission to change, or to obtain specific information from the SON database. In the latter case, the SON function comprises a condition or a set of conditions. In the embodiment, the SON management function in the network comprises parameter-specific sets of conditions. It should be appreciated that it is also possible that the information whether or not permission to a change is to be asked is function-specific, or a mixture of function-specific and parameter-specific configurations.

FIG. 5 starts at a situation, when the SON function notices (point 5-1) a need to change a parameter value, the parameter having associated with it an instruction to ask permission for change from the SON management function (SON man.). Therefore the SON function sends a request for permission to change the parameter value in message 5-2.

In response to message 5-2, the SON management function obtains history information on the parameter change from the SON database (messages 5-3, 5-4), and checks, in point 5-5, whether or not the conditions relating to change of the parameter are fulfilled. In the illustrated example they are fulfilled and the SON management database sends permission to change in message 5-6.

When the permission is received, the SON function performs, in point 5-7, the parameter value change, and sends update information relating to the change to the SON database in message 5-8. The SON database is then updated, point 5-9, by the received information.

The SON function notices (point 5-10) another need to change a parameter value, the parameter having associated with it a condition or conditions. Therefore the SON function obtains history information on the parameter change from the SON database (messages 5-11, 5-12), and checks, in point 5-13, whether or not the condition(s) relating to change of the parameter is/are fulfilled. In the illustrated example they are fulfilled and the SON function performs, in point 5-13, the parameter value change, and sends update information relating to the change to the SON database in message 5-14. The SON database is then updated, point 5-15, by the received information.

In another implementation, when a permission is needed, the update may be performed via the SON management function. In the implementation, the SON management function may be configured to check, whether it has all relevant information to perform a proper update, and if not, request for further information from the SON function, and only after receiving a response with the further information, to update the SON database.

Figure 6:
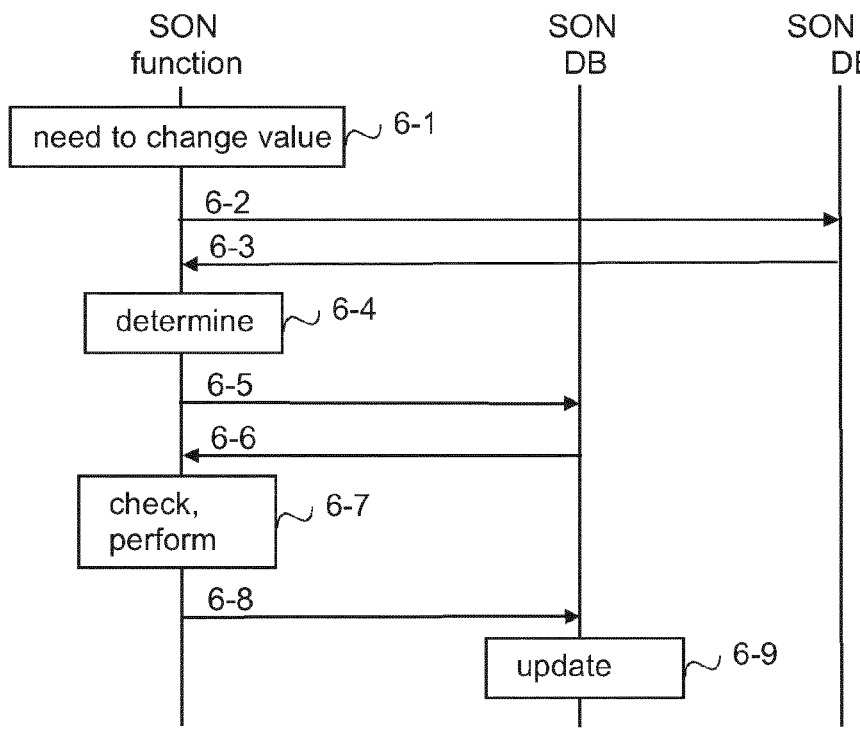
FIGS. 5 and 6 are signaling charts illustrating other embodiments.

FIG. 6 is a signalling chart illustrating an embodiment in which the SON management functionality described above is transferred to a SON function. The SON function may be a large SON function into which all smaller SON functions are integrated.

The SON function notices (point 6-1) a need to change a parameter value. Therefore the SON function obtains, from a database containing SON policies, condition(s) relating to the parameter change (messages 6-2, 6-3) and determines, in point 6-4, information needed for the condition(s). Then the SON function obtains the needed information from the SON database (messages 6-5, 6-6), and checks, in point 6-7, whether or not the condition(s) relating to change of the parameter is/are fulfilled. In the illustrated example they are fulfilled and the SON function performs, in point 6-7, the parameter value change, and sends update information relating to the change to the SON database in message 6-8. The SON database is then updated, point 6-9, by the received information.

The steps/points, signaling messages and related functions described above in FIGS. 4 to 6 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point. For example, if there is no condition, there is no need to perform rest of the procedure but instead simply allow the change. The SON management function related operations illustrate a procedure that may be implemented in one or more physical or logical entities. The signaling messages are only exemplary and may even comprise several separate messages for transmitting the same information. In addition, the messages may also contain other information.

It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
   storing, for at least one configuration parameter whose value is changeable by one or more self-organizing network functions, at least short term history information on changes, including which of the one or more self-organizing network functions performed a previously allowed change to the at least one configuration parameter value; and
   determining based at least on the history information on changes whether to allow a value of the configuration parameter to change.

2. The method as claimed in claim 1, further comprising:
   receiving an update to the history information; and
   updating the history information according to the received update.

3. The method as claimed in claim 1, further comprising:
   associating a configuration parameter with at least one predetermined condition that utilizes the history information and/or with a token information and/or with a locking information, the at least one predetermined condition defining when a change is allowed to be performed based on the history information.

4. The method as claimed in claim 3, wherein the predetermined condition utilizing the history information comprises at least one of the following: a value may be changed after a certain time period, the allowability may depend on the direction of the last or intended change, on the size of the intended change and/or a previous change.

5. The method as claimed in claim 1, wherein the history information includes at least one of the following: a time of a last change, a current value of the parameter, a size of the last change, a direction of the last change, and an indication of a self-organizing network function which performed the last allowed change.

6. A method comprising:
   obtaining, in response to an intended change to a configuration parameter that is configurable by one or more self-organizing network functions, history information on changes of the configuration parameter, including which of the one or more self-organizing network functions performed a previously allowed change to the at least one configuration parameter value;
   comparing the history information with one or more predetermined conditions; and
   in response to the one or more predetermined conditions not being fulfilled, rejecting the intended change; otherwise allowing it.

7. The method as claimed in claim 6, further comprising:
   detecting the intended change in response to receiving from a self-organizing function a request to change a parameter value.

8. The method as claimed in claim 6, further comprising:
   detecting that the configuration parameter is locked or a token is needed for the change and the token is reserved; and
   rejecting the intended change.

9. The method as claimed in claim 6, further comprising:
   sending an update to the history information in response to the intended change being performed.

10. A non-transitory computer-readable medium comprising program instructions configured to perform any of the steps of a method as claimed in claim 1 when the program instructions are run on a processor.

11. An apparatus comprising:
    at least one memory comprising computer program code;
    at least one processor;
    wherein the at least one memory and the computer program code are configured, with the at least one processor, to cause the apparatus at least to:
    store, for at least one configuration parameter whose value is changeable by one or more self-organizing network functions, at least short term history information on changes, including which of the one or more self-organizing network functions performed a previously allowed change to the at least one configuration parameter value; and
    determine based at least on the short term history information, whether to allow a value of the configuration parameter to change.

12. The apparatus as claimed in claim 11, wherein the at least one memory and the computer program code are configured, with the at least one processor, to cause the apparatus at least to:
    perform at a network element level, at a domain manager level and/or at a network management level.

13. A system comprising:
    a first network node comprising at least one processor configured to:

obtain, in response to an intended change to a configuration parameter that is configurable by one or more self-organizing network functions, history information on changes of the configuration parameter, including which of the one or more self-organizing network functions performed a previously allowed change to the at least one configuration parameter value;

compare the history information with one or more predetermined conditions; and reject, in response to the one or more predetermined conditions not being fulfilled, the intended change, otherwise allowing it; and a second network node comprising at least one processor configured to store, for at least one configuration parameter whose value is changeable by one or more self-organizing network functions, at least short term history information on changes.

14. The system as claimed in claim 13, wherein
the first network node further comprises a self-organizing network management function; and
the second network node comprises a database for storing the information.

15. The system as claimed in claim 13, the system further comprising a third network node comprising a self-organizing network function configured to request from the first network node permission to change a configuration parameter value.

16. The system as claimed in claim 13, wherein the history information includes at least one of the following: a time of a last change, a current value of the parameter, a size of the last change, a direction of the last change, and an indication of a self-organizing network function which performed the last allowed change.

* * * * *